March 3, 1970  L. R. SPERBERG  3,498,343
APPARATUS FOR INFLATING PNEUMATIC TIRES WITH AN INERT GAS
Filed Dec. 13, 1966  2 Sheets-Sheet 1

*INVENTOR.*
LAWRENCE R. SPERBERG
*BY*
MARCUS L. BATES

March 3, 1970   L. R. SPERBERG   3,498,343
APPARATUS FOR INFLATING PNEUMATIC TIRES WITH AN INERT GAS
Filed Dec. 13, 1966   2 Sheets-Sheet 2
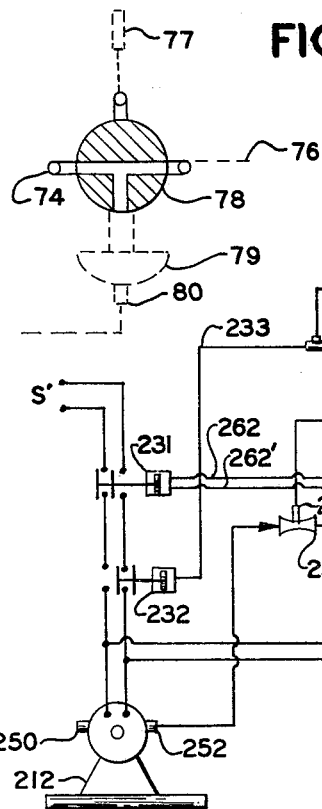
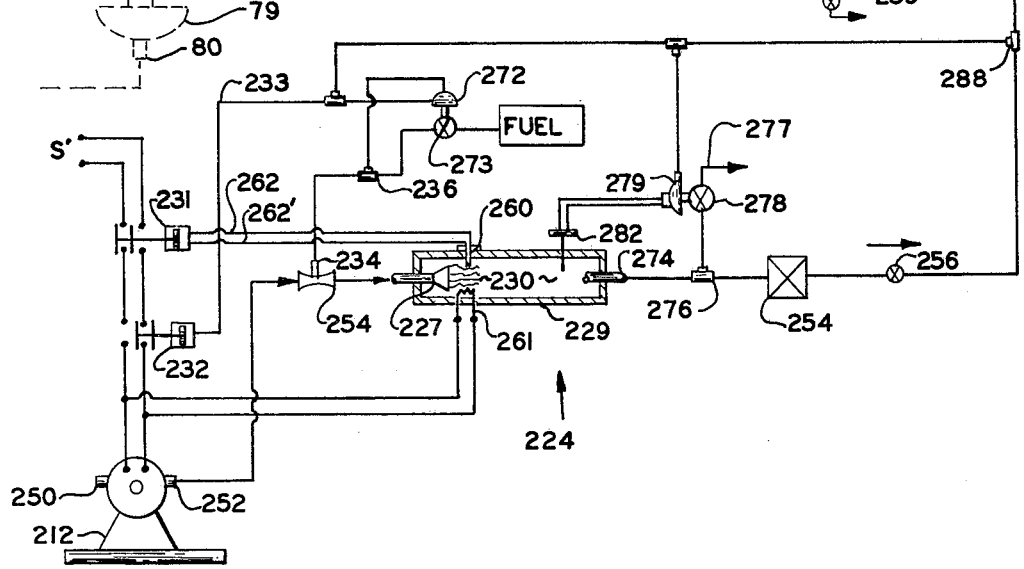
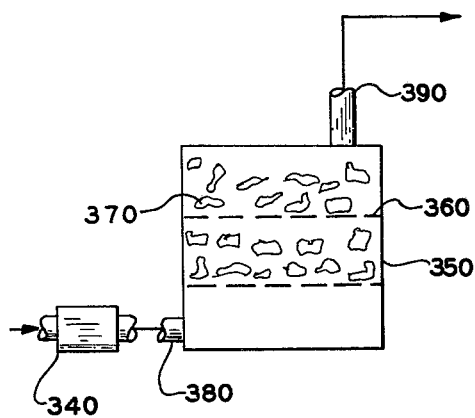
*INVENTOR.*
LAWRENCE R. SPERBERG
*BY*
MARCUS L. BATES

United States Patent Office 3,498,343
Patented Mar. 3, 1970

3,498,343
APPARATUS FOR INFLATING PNEUMATIC
TIRES WITH AN INERT GAS
Lawrence R. Sperberg, 6740 Fiesta Drive,
El Paso, Tex. 79912
Filed Dec. 13, 1966, Ser. No. 601,451
Int. Cl. B01j 7/02; B65b 31/00; B60c 29/00
U.S. Cl. 141—311   4 Claims

ABSTRACT OF THE DISCLOSURE

Apparatus and method for the production of an oxygen free compressed inflating agent for pneumatic tires using the products of incomplete combustion obtained from burning fuel and insufficient air together, and compressing the mixture either before or after the combustion process.

When an elastomeric chamber, especially a tire is inflated with an inert gas, the durability is greatly increased as compared to a tire having oxygen contained in the inflating agent. Helium, carbon dioxide, carbon monoxide, nitrogen, and the rare gases are suitable inert inflating agents. Nitrogen is the most available of these inert gases. The wide spread commercial use of nitrogen as an inflating agent represents a considerable continued investment of capital. The remaining inert gases are prohibitive in cost from a commercial viewpoint.

The combustion of hydrocarbons, such as natural gas, with air results in a mixture of flue gases according to the following idealized chemical reaction:

$$CH_4 + O_2 + N_2 \rightarrow CO_2 + N_2 + H_2O$$

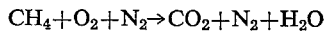

Since stoichiometric conditions are not realized in actual practice, the air/fuel mixture is made slightly deficient of air so as to form a trace of carbon monoxide along with a trace of incomplete combusted hydrocarbons. This resulting mixture, with the water removed, is essentially carbon dioxide and nitrogen, and provides a readily available inert gas that is suitable for use as an inert inflating agent for pneumatic tires. The oxygen content of a mixture of gases provided by this expedient does not exceed the oxygen normally contained in commercially available nitrogen.

SUMMARY

The present invention relates to a method of manufacture of inert gases for inflating pneumatic tires. In carrying this method into practice, several embodiments of the apparatus are illustrated herein that also form a part of this invention.

This invention contemplates the provision of an inert gas generating apparatus that may be used in conjunction with the existing air compressor and storage tank such as found in garages, service stations, and manufacturing facilities where tires are mounted. One form of the invention utilizes a side stream taken from the mid-portion of a flue gas stack of an inert gas generator, while an excess of flue gases are allowed to exhaust to the atmosphere. The flue gases are subsequently compressed and stored, preferably by using the existing compressor and storage tank for this purpose. Another form of this invention contemplates an inert gas generator associated with a novel water displaced surge tank in which the flue gases are collected above the water. A third form of the invention utilizes an automatic control system wherein a surge tank and compressor combination are provided with a bypass circuit to assure proper induction of the flue gases that are being generated. A still further form of this invention teaches the use of an inert gas generator placed on the high pressure side of the air compressor, and wherein a venturi is used to provide the air/fuel mixture for the combustion process. The last form of the invention illustrated herein includes chemical means for removing oxygen from air.

Accordingly, some of the objects of this invention is the provision of the above various recited embodiments of an inert gas generating system, by which the method of the present invention may be carried into practice.

Another object of this invention is to provide a method of manufacturing an inert inflating agent for pneumatic tires.

Another object of this invention is to provide a method of manufacturing an inert inflating agent for pneumatic tires by the combustion of air and fuel, followed by compression and storage of the inert mixture, and removal of the water vapor.

A still further object of this invention is the provision of an inert gas manufacturing system that includes the existing compressor and storage tank that are presently used for inflating pneumatic tires.

Another object of this invention is to provide an inert gas generator that uses compressed air as the air supply, and wherein the fuel is induced into the burner by means of a venturi.

A still further object of this invention is to provide an inert gas generator that is fully automatic, simple in operation, low in cost, and safe in use.

Another object of this invention is the provision of chemical means by which the oxygen of the atmosphere is removed from air, leaving the nitrogen and rare gases to be compressed into a suitable inflating agent for pneumatic tires.

These and other objects of this invention will become apparent from the remainder of this specification and claims.

BRIEF DESCRIPTION OF THE DRAWINGS

FIGURE 4 is an enlarged view illustrating the details of a valve that is used in conjunction with FIGURE 3;

FIGURE 5 is a diagrammatical and partly schematical representation of a fourth embodiment of the present invention; and, FIGURE 6 is a diagrammatical representation of another embodiment by which the method of the present invention may be carried into practice.

DESCRIPTION OF THE PREFERRED EMBODIMENTS

Figure 1:
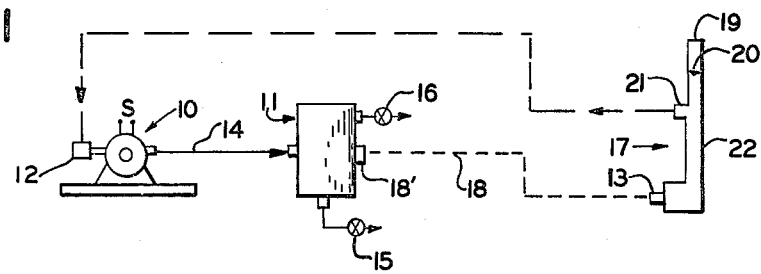
FIGURE 1 is a digrammatical representation showing a simplified embodiment of the present invention.

FIGURE 1 illustrates a simplified embodiment of the invention, and shows a conventional compressor unit having a motor driven compressor 10 and a storage tank 11. The compressor is driven by an electrical motor having a power source S, and includes an air intake 12, and an air outlet 14. The storage tank 11 is provided with a drain cock 15 and an air outlet valve 16 that provides a means for supplying air to a conduit leading to an air chuck, such as found in any filling station or garage.

A fuel burning device generally illustrated by the arrow at numeral 17, includes a compressor and burner control assembly interconnceted by conductor 18, a flue gas stack 22, a balanced damper 20, a side flue gas outlet 21, and a flue gas outlet 19. The side flue gas outlet 21 is adapted to be connected to the air intake 12 of the compressor 10.

Figure 2:
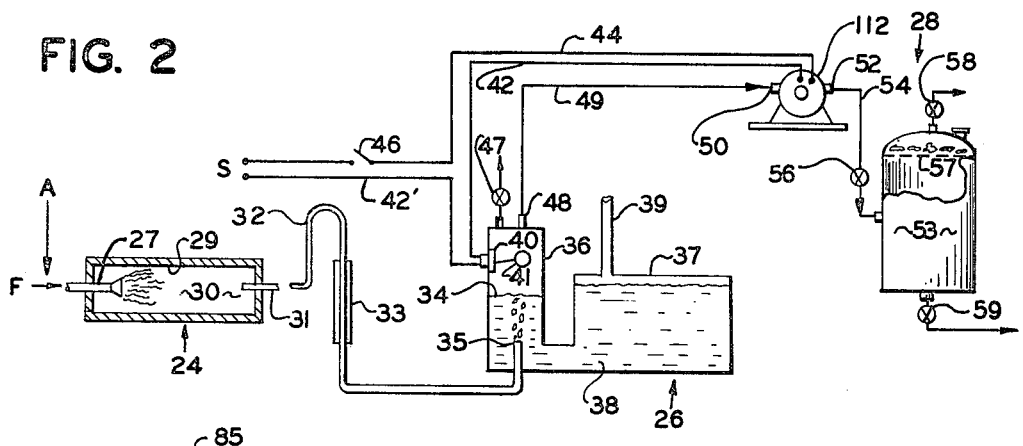
FIGURE 2 as a diagrammatical and partly schematical representation of a second embodiment of the present invention.

FIGURE 2 illustrates another embodiment of the invention, wherein there is illustrated an inert gas generator 24 that is suitably flow connected to a surge tank 26 that in turn is flow connected to the inlet side of an existing compressor and storage tank arrangement 28.

The inert gas generator 24 is suitably provided with a burner 27 that is located within an insulated housing 29 that provides a combustion chamber 30. The burner 27 is suitably connected to a source of air A and a source of fuel F that provides the burner with a predetermined ratio of air/fuel. A combustion chamber outlet 31 is provided with a loop 32 that includes a sight glass 33. The loop extends above the liquid level 34 of the surge tank 26. The surge tank 26 is provided with a first chamber 36, a second chamber 37, and each of the tanks are interconnected as indicated at 38. A standpipe 39 maintains the top of the second chamber at atmospheric pressure.

Located in the upper portion of the first chamber 36 is a ball float device 40 that actuates a switch associated therewith in accordance with the position of the floating ball 41. The switch of the ball float device is connected to electrical conductor 42′, and to the motor of the compressor 112 by conductor 42. The other terminal of the motor is connected to the source S by means of electrical conductor 44. A switch 46 interrupts the current flow through conductor 44.

Located at the upper extremity of the first chamber 36 is an outlet 48 that is suitably flow connected by conduit 49 to inlet 50 of the compressor 112. The compressor outlet 52 is suitably connected to a storage tank 53 by means of conduit 54 and includes a one-way check valve 56. The upper extremity of the storage tank 53 is provided with a perforated screen 57 that is adapted to hold a quantity of drying agent thereabove. The storage tank is provided with a valve 58 interposed in the supply line that leads to an air chuck for the purpose of inflating tires. The lower extremity of the storage tank is provided with a valve 59 that is adapted to drain any accumulation of moisture from the bottom of the storage tank.

Figure 3:
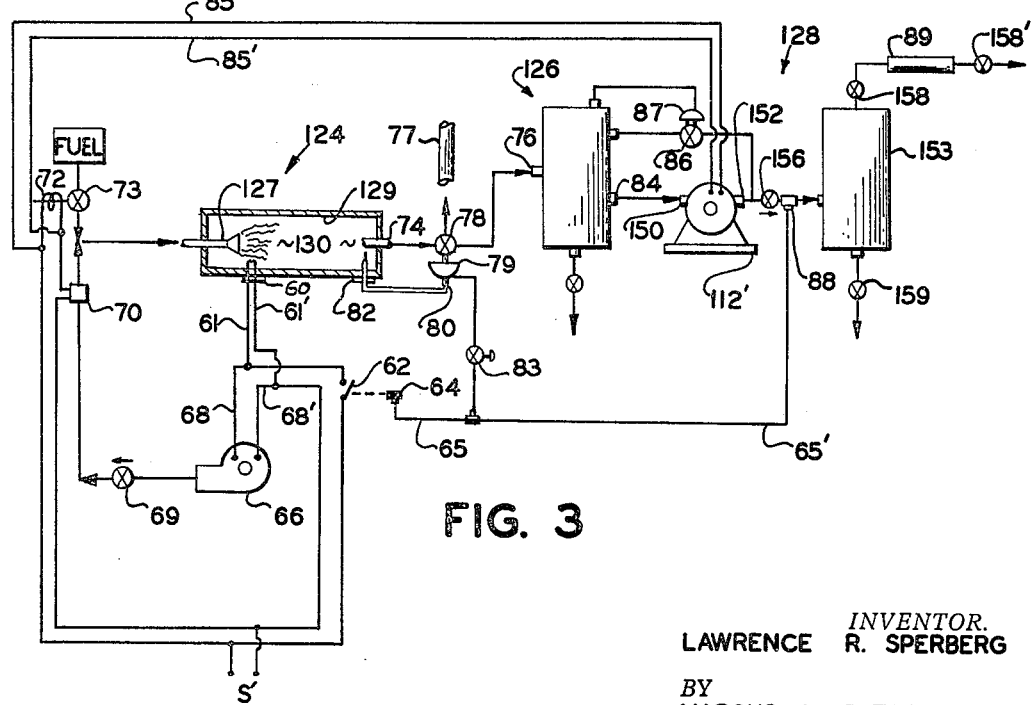
FIGURE 3 is a diagrammatical and partly schematical representation of a third embodiment of the present invention.

FIGURE 3 illustrates still another embodiment by which the present method may be carried into practice, and wherein there is illustrated an inert gas generator, generally illustrated by the arrow at numeral 124, that is flow connected to a surge tank arrangement, generally illustrated by the arrow at numeral 126, that in turn is suitably flow connected to a compressor and storage tank arrangement, generally indicated by the arrow at numeral 128. The inert gas generator includes a burner 127 that is located within the insulated walls 129 of the combustion chamber 130. Located adjacent to the burner is an igniter 60 that is electrically connected by means of conductors 61 and 61′ to a source of electrical current S′. Interposed between the source S′ and the electrical conduit 61′ is a pneumatically actuated switch 62. The switch 62 is actuated by a pneumatic cylinder 64 from a closed to an open position in accordance with the pressure in pressure conduit 65. The source S′ is also connected to a blower 66 by means of conductors 68 and 68′. The air supply from the blower 66 is suitably connected to the burner 127 by means of the illustrated flow conduit having a check valve 69 therein. A sensor 70 is interposed between check valve 69 and the burner 127, and actuates a switch associated therewith from an open position, during conditions of no flow, to a normally closed position during conditions of flow. The switch of flow sensor 70 is series connected with the solenoid 72 of the normally closed fuel valve 73.

Conduit 74 forms the outlet of the inert gas generator, and is suitably connected in the illustrated manner to the surge tank 126 as illustrated, at inlet conduit 76. A stack 77 is interconnected to the before mentioned outlet conduit 74 and the inlet conduit 76 by means of a three way valve 78 (the details of which are amply illustrated in FIGURE 4). The flow valve 78, when actuated to one of its two positions, permits flow from outlet conduit 74 into either the inlet conduit 76 or the stack 77 in accordance with the position of the pneumatic motor 79 associated therewith. Operatively associated with the motor 79 of the valve is a pilot section 80 that is electrically controlled by means of thermo-couple 82. The motor 79 of the valve 78 is pneumatically operated by a regulated fluid pressure received from pressure regulator 83.

The surge tank 126 includes an outlet 84 that is suitably connected to the intake 150 of the compressor 112′. The compressor 112′ is electrically driven and is connected in parallel with solenoid 72 by means of electrical conductors 85 and 85′. A bypass valve 86 flow connects the outlet 152 of the compressor back to the surge tank 126, with the amount of bypassing fluid being flow controlled by means of the pneumatically actuated motor 87 and valve 86 that is controlled in accordance with the pressure in the pressure conduit connected between the motor 87 and the top of the surge tank 126. A one-way check valve 156 is provided between the compressor and the T-fitting 88. The storage tank 153 that contains the compressed inert gas is provided with an outlet valve 158 and 158′ and a drain 159. Between outlet valves 158 and 158′, a drier 89 is provided to remove the last traces of moisture that may be contained within the inert gas. A suitable air chuck for inflating tires is connected to the conduit at valve 158′.

FIGURE 4 illustrates the detais of the thermo-couple controlled three way pneumatically powered motor valve 78. As seen in FIGURE 4, the valve is adapted to interconnect outlet 74 to inlet 76, or alternatively, interconnect the stack 77 to the outlet 74. The position of the valve depends upon the temperature of the thermo-couple.

FIGURE 5 illustrates still another embodiment of the compressed inert gas generation system wherein the inert gas is generated down stream of the compressor unit. As seen in FIGURE 5, the compressor 212 includes an inlet 250 and an outlet 252. The electric motor of the compressor is connected to a source of current S and a thermo-electrically operated switch 231 forms a first disconnect, while a pressure actuated switch 232 provides a second disconnect. The first switch 231 is a time delay reset type that is actuated in response to a thermocouple 260 located in close proximity to the fuel burner and electrical igniter 261. Electrical conductors 262 and 262′ connect thermocouple 260 to the actuating mechanism of the first switch, which remains in closed position for a considerable lapse of time after current is flowing through the contacts thereof. If the thermocouple 260 is heated to a sufficient temperature level before the switch 231 opens, the switch will not assume the open circuit position since its time-out cycle will be interrupted by the action of the thermocouple.

The second switch 232 is pressure actuated in a manner whereby the switch is closed when the pressure in conduit 233 decreases to an arbitrary value of sixty pounds, and the switch is open when the pressure increases to one hundred and twenty pounds. Other pressure limits may be used where different maximum and minimum values are desired.

The inert gas generator 224 is provided with an insulated wall 229 that forms a combustion chamber 230 having an outlet 274 that connects to a T-fitting 276. A pneumatic motor actuated valve 278 is interposed between the T-fitting 276 and the conduit 277 which forms the stack. Motor valve 278 is actuated by pneumatic motor 279 which receives a source of fluid pressure from conduit 233. The pneumatic motor valve is actuated by the illustrated pilot control device which is responsive to the temperature of thermocouple 282. When thermocouple 282 is heated, motor 279 closes the normally open valve 278 to thereby permit the flue gases from combustion chamber 230 to flow through conduit 277.

A heat exchanger or flue gas cooling device 254 is flow connected between the T-connection 276 and the one way check valve 256. A second T-fitting 288 interconnects storage tank 253 and pressure conduit 233. A valve 258 is adapted to supply compressed inert gas for the purpose of inflating tires. A drain cog 259 is provided at the lower extremity of the storage tank so as to enable water that may accumulate therein to be removed from the tank. Located in the top extremity of the storage tank is a perforated screen holding a drying agent 289.

The before mentioned venturi 254 is provided with a fuel inlet 234 that is connected to the fuel motor valve 273 by a T-connection 236. Motor valve 273 is actuated by the motor diaphragm 272 which in turn is provided with a pilot section which is actuated in accordance with the pressure at 236. The flow of fuel through valve 273 is controlled in accordance with the pressure at T-fitting 236.

FIGURE 6 shows an air drier 340 operatively flow connected to a container 350. Spaced apart perforated plate members 360 support an oxygen removing chemical 370 thereon. An air inlet 380 is provided at the lower extremlated wall 229 that forms a combustion chamber 230 havity of the container, and an inert gas outlet is provided at the upper extremity of the container.

OPERATION

In the operation of the embodiment depicted in FIGURE 1, the motor driven compressor 10 is connected to a source of current S whereby the motor is energized in accordance with the pressure responsive device 18'. The pressure responsive device 18' is connected to the automatic fuel control device 13 of the inert generating device 17 by a conduit 18. When the pressure in the storage tank 11 is reduced to a predetermined amount, due to the use of compressed inert gas at 16, pressure responsive device 18' energizes the motor driven compressor 10 and at the same time energizes the fuel control devices 13 so as to start the compressor 10 and at the same time cause combustion to occur in the inert gas generator. Upon occurrence of combustion in the inert gas generator 17, flue gases flow through stack 22, and exit at the outlet 19. The inlet side 12 of the compressor is connected to the side outlet 21 of the inert gas generator, and accordingly the combustion products are sucked from the outlet 21 into the inlet 12 of the compressor, where it is compressed and then flows into the storage tank 11. The inert gas generator 17 produces an excess amount of flue gases so as to assure the production of a greater volume of flue gases at 22 than is demanded by the compressor 10. Accordingly, there will always be an excess quantity of flue gases exiting at outlet 19. Damper 20 is a barometric type damper that provides a controllable pressure within the stack 22. Upon the storage tank 11 reaching a predetermined pressure, the pressure responsive device 18' interrupts the flow of current from source S to the motor of the compressor 10, and at the same time discontinues the flow of fuel at 13. A time delay (not shown) may advantageously be incorporated into the system to permit a time lag between activation of the inert generator and the energization of the compressor in order to preclude uncombusted air and fuel being compressed at 10.

In the operation of the embodiment illustrated in FIGURE 2, the inert gas generator 24 is provided with a highly efficient burner 27 that is supplied with an air/fuel ratio that is always deficient of air, to thereby produce flue gases within the combustion chamber 30 having only a trace of oxygen. The air and fuel to burner 27 are supplied under sufficient pressure so as to overcome the head between liquid level 34 and the upstanding free end of the fluid conduit 35. As flue gases are generated in the combustion chamber 30, the flue gases flow through outlet 31, through the loop 32, through the free end 35 of the conduit, where they bubble up into the first chamber 36 of the surge tank 26.

The loop 32 precludes liquid returning from the surge tank 26 into the combustion chamber. The sight glass 33 is useful in adjusting the liquid level 34 by venting the upper portion of the first chamber of 36 by means of valve 47, prior to igniting the inert generator. Chamber 36 is interconnected to the second chamber 37 by means of portion 38 of the surge tank. The stand pipe 39 maintains the upper portion of the second chamber at atmospheric pressure. The relative size of chamber 36 as compared to chamber 37 is of a magnitude whereby large changes in a vertical direction of liquid level 34 produces a small change in the level of the fluid contained within the second chamber. As the liquid level 34 rises within chamber 36, flow switch 40 will be de-energized when the ball 41 reaches the upper limit of its travel to thereby discontinue current flow to the compressor 112. The chamber 36 is provided with an inert gas outlet 48 that is connected by means of fluid conduit 49 to the inlet 50 of compressor 112. The compressor outlet 52 is connected by means of fluid conduit 54 to the inert gas storage tank 53. A one way check valve 56 prevents the return of compressed inert gas from the storage tank 53 back into the system. A suitable drying material is suspended above screen 57 so as to completely dry the inert gas as it flows through the outlet valve 58 to its point of use.

The burner 27 may be ignited by any conventional means and the air/fuel ratio adjusted by determining the relative flow rates through A and F so as to manufacture an oxygen free flue gas within the combustion chamber 30. As the flue gases flow through the loop 32 and into the chamber 36, liquid level 34 will continue to lower until flue gases are then flowing through stand pipe 39. The switch 46 is then closed so as to connect the compressor to a source of current. Compressed air flows from chamber 36 through conduit 49 into the inlet 50 of the compressor, where the flue gases are compressed in the before described manner. The rate of flow of the combustion gases from combustion chamber 30 into the chamber 36 is regulated to approximately the capacity of the compressor 112. Should the compressor 112 use the flue gases within the chamber 36 faster than the gases accumulate, the flow switch 40 will interrupt the current flow through the electrical conduit when the ball 41 reaches the illustrated position. As the flue gases accumulate within the chamber 36, so as to enable liquid level 34 to reach a lower level, switch 40 will again be closed so as to energize the compressor. Should the flue gases continue to accumulate within the chamber 36, the liquid level 34 will again lower a sufficient amount to allow the flue gases to flow through portion 38 of the surge tank and out of the stand pipe 39.

The embodiment of FIGURE 3 discloses a fully automatic inert gas generating and compressing system. The system of FIGURE 3 is in standby condition with current being supplied at S'. Looking at the current flow through the portion of the circuit that includes the switch 62, it is obvious that the igniter 60 and the blower 66 are de-energized due to the open circuit condition of the switch 62. Since no air is flowing through the flow responsive means 70, the switch associated with the device 70 is in open circuit condition, and accordingly there is no current flow through the solenoid 72 or to the compressor 112'. When the pressure of the inert gas contained within the storage tank 153 is reduced to a predetermined value, the pressure responsive device 64 closes switch 62 to thereby complete the circuit from S' to igniter 60, and at the same time energizes the blower 66. The flow of air through flow responsive switch 70 actuates the switch and completes the circuit to solenoid 72 and to compressor 112'. Energization of solenoid 72 opens the normally closed fuel valve 73 to thereby allow fuel to mix with the air from the blower, where the fuel and air then flow through the burner 127. The time delay involved during the interval that the air commences to flow through pressure device 70 until it builds up to normal velocity, provides a suitable purging cycle for the inert gas generator. The igniter 60 causes combustion to occur within combustion chamber 130 and the combustion products pass through outlet 74, through the three way valve 78, and out stack 77.

After a reasonable lapse of time, the thermocouple 82 will be heated to a temperature level whereby pilot valve 80 causes the motor of valve 79 to move the three way valve 78 whereby flow from the outlet 74 into the stack 77 is discontinued, and flow from outlet 74 to the inlet 76 is initiated. The inert gas from combustion chamber 130 is now flowing into the surge tank 126 where the gas is received by the inlet 150 of the compressor and transferred into the storage tank 153. Should the pressure within the surge tank 126 reach a set or predetermined minimum value, motor 87 of pneumatically controlled motor valve 86 will throttle the valve so as to permit by passing along the following bypass circuit: outlet 84, inlet 150, outlet 152, valve 86, and into the surge tank 126. The motor valve 86 and 87 throttles the degree of bypassing in direct proportion to the pressure within the surge tank 126. Upon the pressure within the storage tank 153 reaching a set or predetermined maximum value, the pressure responsive device 64 will open the switch 62, thereby discontinuing the action of the blower and igniter. Upon shutdown of blower 66, flow responsive switch 70 opens, thereby discontinuing the flow of current through the solenoid 72 and to the compressor 112. Upon de-energization of selonoid 72, the normally closed valve 73 returns to the closed position thereby shutting off the flow of fuel into the burner. The thermocouple 82 cools, and the motor valve 78 and 79 are returned to the position whereby the stack 77 communicates with outlet 74. Since the valve 78 essentially prevents flow at inlet 76, and the one-way check valve 156 prevents flow from the surge tank 153 back into the system, it follows that the surge tank and bypass system are isolated from the remainder of the inert gas generator device, and accordingly these elements remain in this static condition until the system is again set into operation by the pressure at the pressure responsive device 64 reaching a minimum set or predetermined value.

The operation of FIGURE 5 includes automatic control of the compressed inert gas system. The inert gas system of FIGURE 5 is shown in standby condition, with the igniter 261 de-energized, and sufficient air pressure in storage tank 253 to maintain the pneumatically actuated switch 232 in open position. The device of FIGURE 5 is placed in standby condition by manually closing the reset switch 231, where it will remain in closed position so long as the thermocouple 260 is heated within a few seconds after igniter 261 is energized, to thereby maintain switch 231 in closed position. The pressure actuated switch 232 closes when the pressure in tank 253 is reduced to an aribtrary value of 60 pounds, and opens when the pressure in the tank exceeds an arbitrarily selected value of one hundred and twenty pounds. Therefore, switch 232 will remain in open position until the pressure in tank 253 is reduced to sixty pounds, due to the inert gas contained therein being used through valve 258. Upon the pressure within tank 253 being reduced to sixty pounds, this condition will be sensed by switch 232, since switch 232 communicates with storage tank 253 by means of conduit 233 and T-fitting 288. Upon switch 232 closing, compressor 212 is energized along with igniter 261, thereby compressing air that flows from the outlet 252, through the venturi 254, through burner 227, into combustion chamber 230, through outlet 274, and to the T connection 276. Since valve 256 is a one way check valve, and since the pressure within storage tank 253 is approximately sixty pounds, the flow from T-fitting 276 will be into the stack 277. Flow of air through venturi 254 reduces the pressure at connection 234 and 236, thereby causing the pilot of the motor of valve 273 to actuate motor 272 thereby opening valve 273 to permit fuel to flow from the fuel supply into the venturi 254. The time delay inherent in the events that have taken place up until now provides the system with an automatic purge cycle. Since fuel is now flowing to burner 227, igniter 261 ignites the mixture of air and fuel, and combustion chamber 230 begins to increase in temperature. Accordingly, thermocouple 282 soon reaches a temperature level that actuates the pilot associated with motor 279 of pneumatic motor valve 278 to thereby close the valve 278, whereby the flow must now proceed from T-fitting 276, through inter cooler 254, through the one way check valve 256, and into the storage tank 253.

Upon the pressure within storage tank 253 reaching approximately 120 pounds, pressure sensitive switch 232 will be opened, thereby interrupting the current flow from the source S to the electric motor that drives the compressor 212. Shut down of compressor 212 interrupts the air flow through the venturi 254, thereby causing the valve 273 to be returned to the closed position by the action of the motor 272, and accordingly, the fuel and air supply to burner 227 are both discontinued. Thermocouple 282 then cools, thereby returning valve 278 to its open position whereby stack 277 now communicates with the combustion chamber 230. One way check valve 256 prevents the return of the compressed inert gas from the storage tank 253. Hence the system is now in the stand by condition with the switch 231 being held in the closed position since the time out period of the device functions only when the compressor is running, or the thermocouple 260 fails to assume the hot condition due to combustion failure. The system will remain in this condition until the pressure within storage tank 253 is again reduced to the predetermined value of approximately sixty pounds, whereupon the pressure responsive switch 232 will again close, thereby energizing the compressor 212, whereupon the above sequence of events will again occur to restore one hundred and twenty pounds pressure of inert gas within the storage tank 253.

In the operation of the device illustrated in FIGURE 6, an existing compressor and storage tank (not shown) is attached to the outlet at 390. When the compressor is energized, air flows through the drier 340, into inlet 380, along a tortuous path through the chemical bed supported by perforated plate members 360, to the before mentioned outlet at 390.

The drier contained within container member 340 may advantageously be a desiccant that can be reactivated by heating the material in order to drive off the absorbed or adsorbed moisture. The chemical 370 is a substance that readily absorbs or adsorbs oxygen from air, and is preferably a substance that may be reactivated, similarly to the above described desiccant. Where the chemical 370 is a liquid, bubble cap trays are substituted for the perforated plates 360, and means are provided to keep the plates immersed in the liquid, so as to attain proper scrubbing of the gas as it flows through the trays.

One example of a suitable oxygen removing chemical is barium oxide, which absorbs oxygen from air when heated to 500° F., and releases the oxygen when heated to 1000° F. This expedient is known as "Brin's Oxygen Process."

It should be understood that any organic or inorganic solid or liquid that removes oxygen from air is contemplated by the present invention.

It will be understood that other embodiments and modifications of this invention are possible, and it is not intended to limit the invention by the foregoing, but to limit it only by the scope of the appended claims.

I claim:

1. An apparatus for inflating pneumatic tires comprising an inert gas generator, a source of fuel and air, a surge tank, a compressor, and a storage tank;

said inert gas generator including a burner and a combustion chamber; means connecting said burner to said source of fuel and air; means associated with said burner to maintain a combustion mixture that results in essentially all of the oxygen being combusted into products of combustion;

said surge tank including means by which the pressure therein is maintained within a predetermined pressure limit, and further including flow control means for exhausting uncombusted air and fuel;

conduit means connecting said surge tank to the combustion chamber of said inert gas generator; conduit means interconnecting said compressor to said surge tank and storage tank; and an outlet means associated with said storage tank for inflating pneumatic tires with the inert gas contained within said storage tank;

said surge tank includes a first chamber, a second chamber, said first and second chambers being flow connected at their lower extremities, said first and second chamber having a liquid phase and a gaseous phase;

said conduit means connecting said surge tank to said combustion chamber also being in flow communication with the gaseous phase of said first chamber;

means maintaining said second chamber at ambient pressure; float control means responsive to the liquid level in the first chamber for energizing said compressor when the liquid level in the first chamber reaches a lower elevation and for de-energizing said compressor when the liquid level reaches an upper elevation.

2. The apparatus of claim 1 wherein said storage tank includes means forming a lower portion for removing entrained moisture and an upper portion thereof having a drying agent therein whereby the inert gas flowing therethrough is completely dried.

3. The apparatus of claim 1, and further including a loop located within said conduit means connecting said surge tank to said combustion chamber with the upper extremity of said loop being higher in elevation than the liquid level in said first chamber to thereby prevent liquid from flowing from said surge tank into said combustion chamber.

4. The apparatus of claim 3 wherein said conduit means connecting said surge tank to said combustion chamber includes a terminal end which terminates within said first chamber in underlying relationship with respect to the normal liquid level therein to thereby form a fluid seal in conjunction with said loop.

References Cited

UNITED STATES PATENTS

| | | | |
|---|---|---|---|
| 2,085,584 | 6/1937 | Haskell | 23—281 |
| 2,195,898 | 4/1940 | Newton | 55—170 |
| 2,748,846 | 6/1956 | Smith et al. | 431—79 X |
| 2,864,960 | 12/1958 | Von Linde et al. | |
| 2,897,158 | 7/1959 | Sanzenbacher et al. | 23—281 X |
| 3,215,503 | 11/1965 | Nessler | 23—281 |
| 802,905 | 10/1905 | Bobrick | 152—415 |
| 2,772,952 | 12/1956 | Jacobs | 23—281 |
| 3,000,707 | 9/1961 | Barstow. | |
| 3,177,150 | 4/1965 | Cameron | 23—281 X |

FOREIGN PATENTS

| | | |
|---|---|---|
| 668,384 | 8/1963 | Canada. |
| 390,551 | 4/1933 | Great Britain. |

LAVERNE D. GEIGER, Primary Examiner

EDWARD J. EARLS, Assistant Examiner

U.S. Cl. X.R.

23—281; 141—38; 152—415